Dec. 23, 1958 W. E. HEDDERICH 2,865,516
TURNOVER APPARATUS
Filed Nov. 10, 1953 3 Sheets-Sheet 1
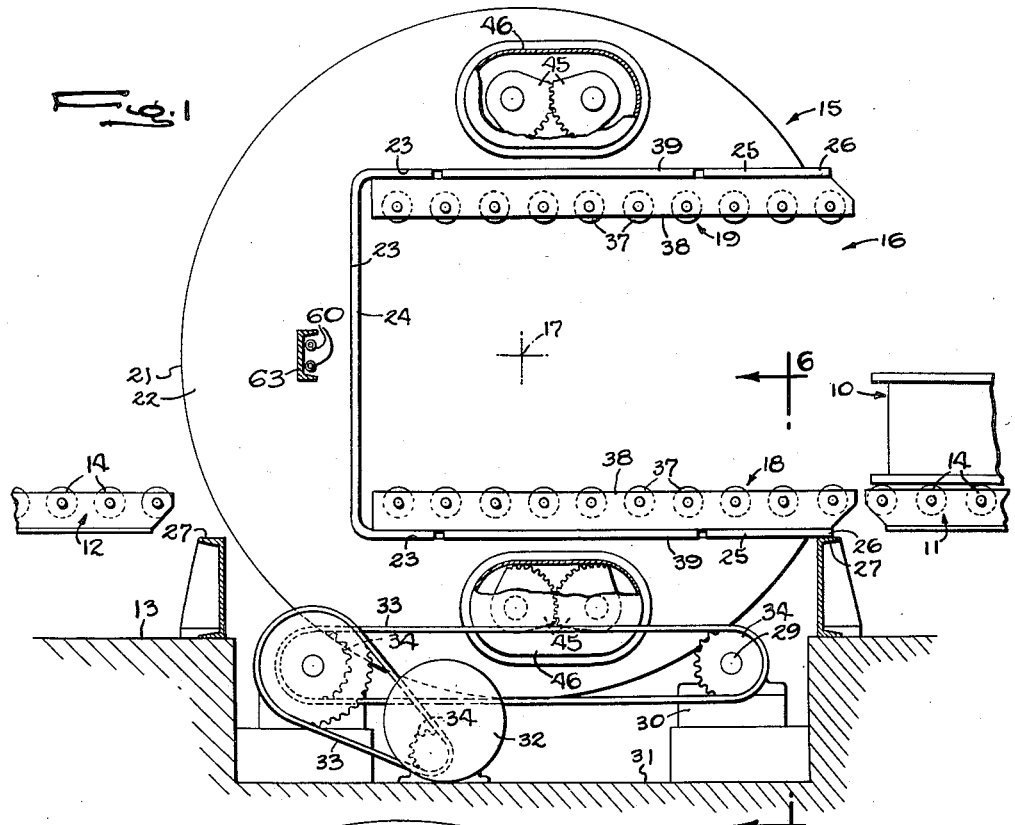
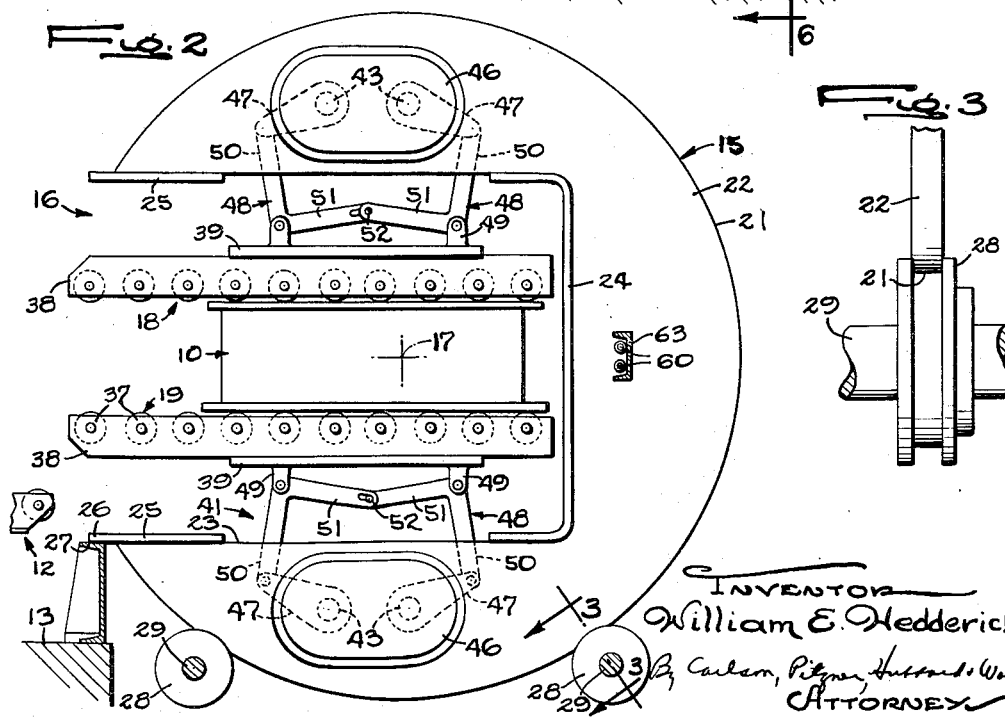
INVENTOR
William E. Hedderich
By Carlson, Pitzner, Hubbard & Wolf
ATTORNEY

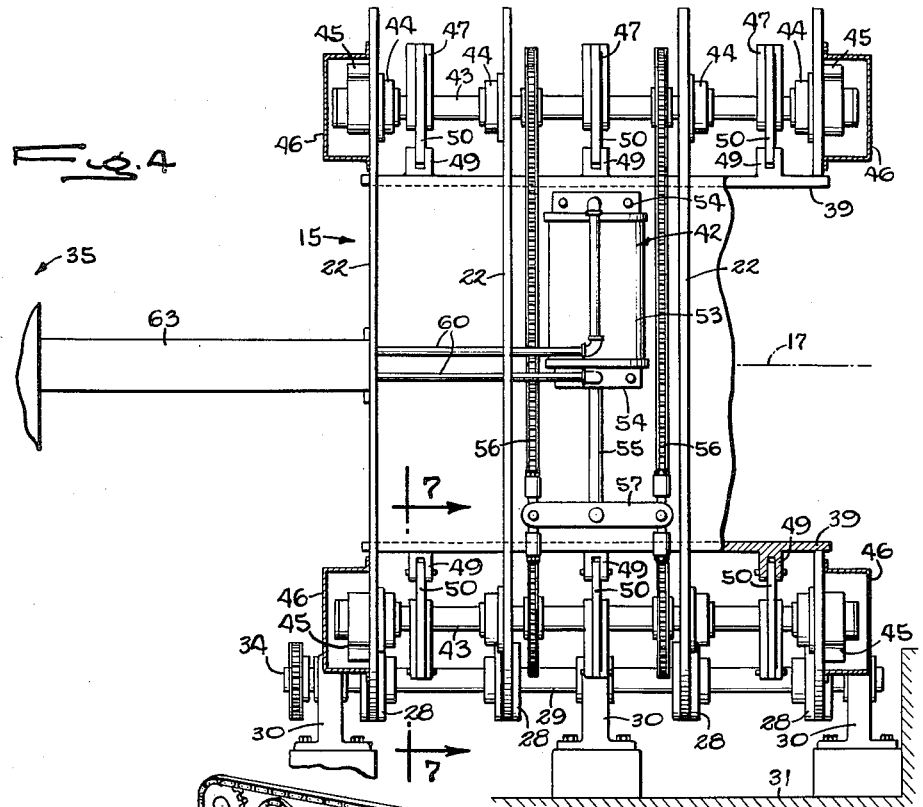
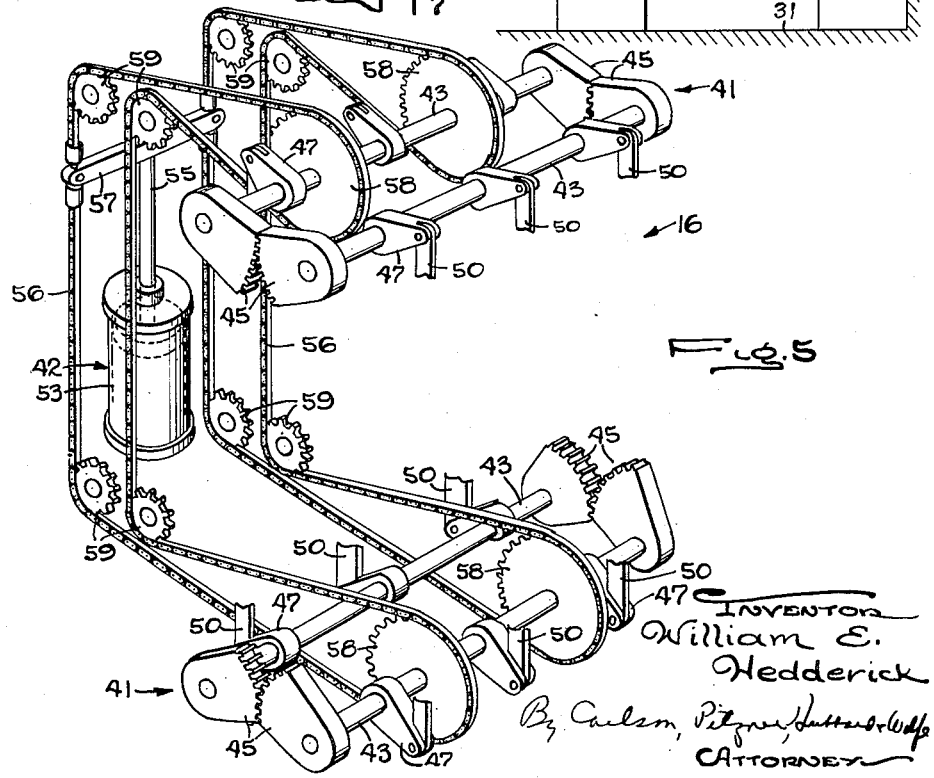

Dec. 23, 1958 W. E. HEDDERICH 2,865,516
TURNOVER APPARATUS
Filed Nov. 10, 1953 3 Sheets-Sheet 3

INVENTOR
William E. Hedderick
By Carlsem, Pitzner, Hubbard Wolfe
ATTORNEY

United States Patent Office 2,865,516
Patented Dec. 23, 1958

2,865,516

TURNOVER APPARATUS

William E. Hedderich, Rockford, Ill., assignor to Greenlee Bros. & Co., Rockford, Ill., a corporation of Illinois Application November 10, 1953, Serial No. 391,185

6 Claims. (Cl. 214—1)

This invention relates generally to apparatus for turning over large heavy objects such as sand filled core boxes used in foundries and, more particularly, to turnover apparatus of the type having a rotary carrier and clamping jaws thereon defining a recess which receives workpieces transferred from and to be discharged to horizontal conveyors.

One object of the invention is to provide novel turnover apparatus of the above character which is adapted to receive workpieces of widely varying sizes, which can turn over large workpieces in a small operating space, and in which the clamped workpiece is centered and only a small driving force is required to effect the turnover.

Another object is to provide novel turnover apparatus of the above character in which workpieces longer and wider than the work receiving recess may be loaded and unloaded both radially and horizontally of the turning axis and in which the workpieces are centered about the latter to reduce the moment arm and the force required for turning.

A further object is to center workpieces about the carrier axis by disposing the clamping jaws on opposite sides of the axis and moving the jaws toward and away from each other in unison.

Still another object is to provide novel jaw actuating mechanism mounted within the periphery of the carrier to enable the latter to be supported on and turned by rotary elements disposed below and engageable with angularly spaced points on the carrier periphery.

A more detailed object is to provide a novel carrier construction having a series of parallel C-shaped plates resting on and driven frictionally by rollers engaging their peripheries.

Other objects and advantages of the invention will become apparent from the following detailed description taken in connection with the accompanying drawings, in which Figure 1 is a side elevational view of turnover apparatus embodying the novel features of the present invention and shown in a loading position, some of the parts being broken away.

Fig. 2 is a sectional view taken along the line 2—2 of Fig. 6 and showing the parts in turned over clamped positions.

Fig. 3 is a fragmentary sectional view taken along the line 3—3 of Fig. 2.

Fig. 4 is a fragmentary rear elevational view of the apparatus in an unloaded condition with some of the parts broken away.

Fig. 5 is a fragmentary perspective view of the jaw actuating and supporting mechanism with the parts in their released positions.

Figure 6:
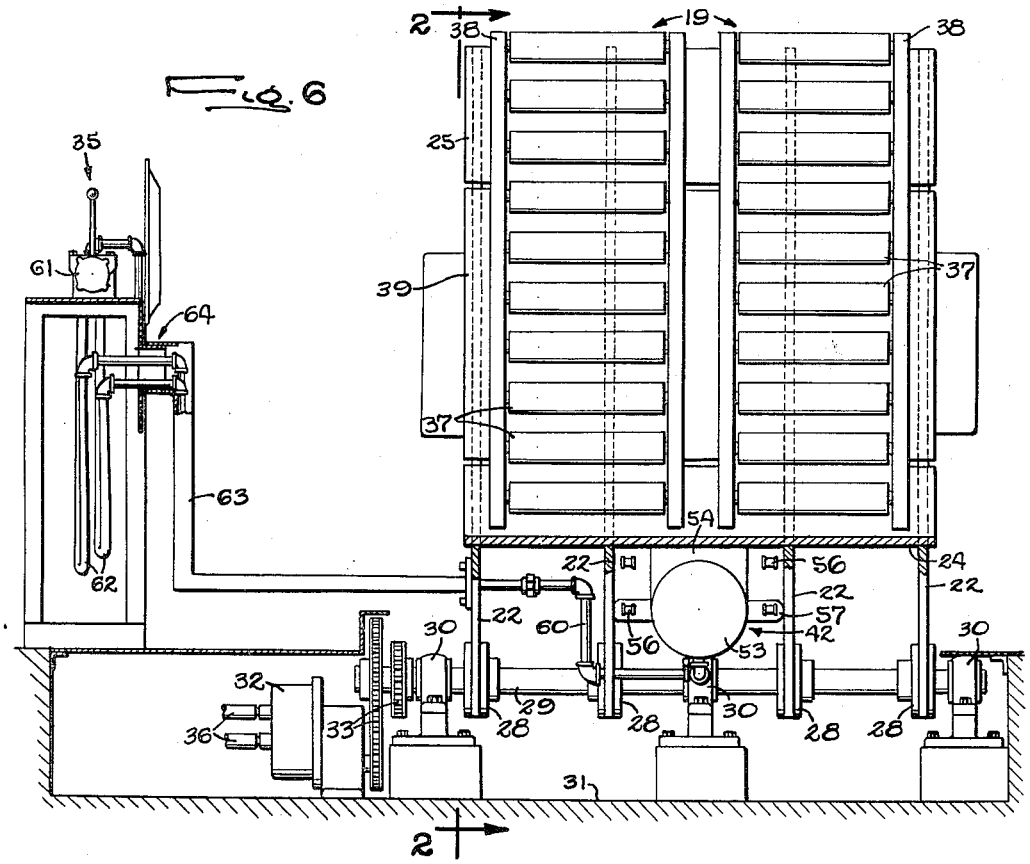
Fig. 6 is a sectional view taken along the line 6—6 of Fig. 1 and showing the carrier turned to an intermediate position.
Figure 7:
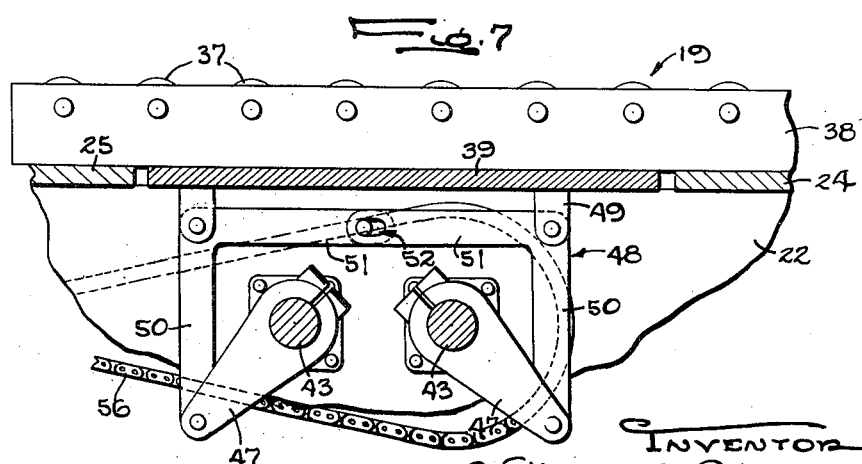
Fig. 7 is a fragmentary sectional view taken along the line 7—7 of Fig. 4.

In the drawings, the invention is shown for purposes of illustration embodied in turnover or flip-flop apparatus which is especially adapted to handle large heavy workpieces 10 such as rectangular sand filled core boxes and which is supported between adjacent ends of two alined horizontal conveyors 11 and 12 resting on a floor 13 and having parallel rollers 14 extending transversely of the conveyors. Generally, the improved apparatus comprises a rotary C-shaped carrier or drum 15 which receives core boxes in a radially and axially opening recess 16 and which is rotatable through a half revolution about a horizontal axis 17 from a loading position (see Fig. 1) in which the recess receives workpieces advanced horizontally from one conveyor 11 to an unloading position (see Fig. 2) from which the workpieces may be discharged horizontally onto the other conveyor 12. Opposed walls of the recess are defined by a pair of generally flat clamping jaws or platforms 18 and 19 mounted on the carrier and movable relative to and toward and away from each other between outer released positions (see Fig. 1) in which one jaw is level with each of the conveyors 11 and 12 in the loading and unloading positions respectively of the carrier and inner clamped positions in which the jaws engage opposite sides of a workpiece as shown in Fig. 2.

In accordance with one aspect of the invention, the carrier 15 is constructed in a novel manner to reduce the moment arm of a workpiece supported thereon and the force required for turning the same and to enable the carrier to be supported on its outer periphery 21 and rotated by a friction drive therewith. To achieve these ends, the carrier 15 comprises a series of flat C-shaped vertical plates 22 secured rigidly together in axially alined and axially spaced parallel relation and having U-shaped inner peripheries 23 opening radially in the same direction to define the work receiving recess 16. The latter is extended radially and inwardly past the carrier axis 17 as shown in Figs. 1, 2, and 6 by spacing the closed ends of the inner U-shaped plate peripheries 23 inwardly from the axis so that each workpiece 10 may be substantially centered relative to the latter during turnover.

The C-shaped plates 22 are secured together in this instance by welding the same to an elongated heavy plate member 24 of U-shaped cross section spanning and seated in the closed ends of the U-shaped inner plate peripheries 23 and two flat rectangular plate members 25 spaced from the U-shaped plate member 24 and extending longitudinally of the carrier axis 17 and across the outer end portions of the parallel legs of the plate peripheries. To limit the range of turning of the carrier to the half revolution between its loading and unloading positions, the rectangular plate members 25 project radially and outwardly beyond the peripheries of the C-shaped plates as indicated at 26 to engage channel members 27 secured to the conveyor floor 13. In this instance, there are four C-shaped plates 22 each of which, on its outer periphery 21, is concentric with the common plate axis and extends around the latter approximately 270 degrees from one rectangular plate member to the other.

Supporting the carrier 15 for rotation about its horizontal axis 17 are a plurality of rotary elements 28 disposed below and engaging the periphery 21 of each of the C-shaped plates 22 at angularly spaced points. In the present instance, the rotary elements 28 are peripherally grooved rollers or sheaves secured to and axially spaced along two horizontal shafts 29 parallel to the carrier axis 17, the plate peripheries 21 resting in the bottoms of the grooves as shown in Figs. 3 and 6 and the defining walls of the latter preventing relative axial movement between the shafts and the carrier. The shafts 29 are journalled in bearing blocks 30 secured rigidly to the floor of a pit 31 disposed below the level of the conveyor floor 13 for alinement of the jaws 18 and 19 with the conveyors 11 and 12 in the loading and unloading positions of the carrier as shown in Fig. 1.

A rotary fluid pressure motor 32 mounted in the pit and connected to the shafts 29 by chains 33 and sprockets 34 is adapted when energized to rotate the carrier about its axis through frictional engagement between the sheaves 28 and the plate peripheries 21. Pressure fluid, herein air, for energizing the motor 32 in opposite directions is supplied by a suitable source (not shown) and controlled by a valve (not shown) located at a control station 35 (Fig. 6) and connected to the motor by pipes 36.

The transfer of workpieces 10 into and out of the work receiving recess 16 is facilitated by forming the clamping jaws 18 and 19 of conveyor sections having parallel rollers 37 thereon, the rollers of each jaw extending parallel to the rollers 14 on the one of the conveyors 11 and 12 with which the jaw is alined in the loading and unloading positions of the carrier 15. Herein, each jaw comprises two conveyor sections having parallel side rails 38 rotatably supporting opposite ends of the rollers 37 thereof and welded to a rectangular plate member 39 which, in the released positions of the jaws, spans and engages the straight inner peripheral edge portions 23 of the C-shaped plates 22 and lies between and in the plane of one of the rectangular plate members 25 and one leg of the U-shaped plate member 24 as shown in Figs. 1 and 6. Where, as in the present instance, the conveyors 11 and 12 are aligned and extend in the same direction instead of extending at right angles to each other, the rollers 37 of both jaws are parallel to each other and to the carrier axis 17.

To center each workpiece 10 about the carrier axis 17, the clamping jaws 18 and 19 are spaced equidistantly from the latter and are moved toward and away from each other in unison to clamp and release a workpiece. This is accomplished in accordance with another aspect of the invention by a novel supporting and actuating mechanism 41 for each jaw (Figs. 2, 4, 5, and 7) located within the periphery of the carrier to avoid interference with the sheaves 28 and their shafts 29 and adapted for operation in unison with the mechanism for the other jaw by a single power actuator 42 also located within the carrier periphery. This mechanism 41 for each jaw includes two circumferentially spaced parallel shafts 43 extending parallel to the carrier axis 17 through the C-shaped plates 22 between the inner and outer peripheries 21 and 23 of the latter and journaled in bearings 44 carried by the plates. At their opposite ends the two shafts 43 extend axially beyond outer sides of the outer C-shaped plates and are connected together for rotation together but in opposite directions by pairs of intermeshing gear segments 45 fast on adjacent shaft ends and enclosed in suitable housings 46.

Connecting each of the jaws 18 and 19 to its associated pair of shafts 43 are a series of linkages which are spaced axially along the shafts and which convert oscillating motion of the latter to reciprocating motion of the jaws. Each of these linkages comprises a pair of arms 47 one rigid with and projecting radially and outwardly from each shaft and a pair of bell cranks 48 fulcrumed on lugs 49 projecting rigidly from laterally spaced points on the outer side of the jaws. One leg 50 of each bell crank projects outwardly from the jaw and is pivotally connected at its outer end to the free end of each arm 47. The other legs 51 of the pair of bell cranks project along the outer side of the jaw and toward each other from their fulcrums and are pivotally and slidably connected together as indicated at 52 to permit movement of these legs relative to each other during swinging of the other legs 50 with the arms about the shaft axes. In this instance, there are three such linkages connecting each jaw and its shafts 43, one pair of arms 47 and bell cranks 48 being located in each of the three spaces between the four C-shaped plates.

The common power actuator 42 for the jaw actuating mechanisms 41, in this instance, is operated by fluid under pressure and includes a cylinder 53 secured as by brackets 54 to the outer side of the closed end of the U-shaped plate member 24 between the inner two C-shaped plates. The rod 55 of a piston slidable in the cylinder is connected to each pair of jaw actuating shafts 43 for oscillation of the latter during reciprocation of the piston. Such connection is effected by two chains 56 which are secured at opposite ends to opposite ends of an equalizer bar 57 pivoted intermediate its ends on the piston rod and which extend around driving sprockets 58 fast on one of each pair of shafts 43 and idler sprockets 59 rotatably mounted on the carrier plates 22.

Pressure fluid, herein air, is admitted to and released from opposite ends of the cylinder 53 through two pipes 60 projecting rigidly from the carrier 15 first parallel to the carrier axis, then radially inward to the carrier axis, and finally along the latter and into the control station 35 where the flow of pressure fluid to and from the cylinder is controlled by a reversing valve 61 (Fig. 6) connected to the pipes by flexible hoses 62. The pipes 60 extend along and are partially enclosed for protection by a right angular channel member 63 secured at one end to the carrier and rotatably mounted at its other end on the control station framework as indicated at 64 (Fig. 6).

In the operation of the improved turnover apparatus, let it be assumed that the carrier 15 is in its loading position and the jaws 18 and 19 are in their released positions as shown in Fig. 1, one plate projection 26 engaging one stop channel 27 and one jaw 18 being level with the conveyor 11 and constituting an extension of the latter for the transfer of a workpiece into the work receiving recess 16 and between the jaws. When the latter are open, the arms 47 of each jaw actuating mechanism 41 extend outwardly away from the adjacent jaw and the connected bell crank legs 51 are alined as shown in Fig. 6. Then, after a workpiece 10 has been positioned between the jaws and the reversing valve 61 has been actuated to close the jaws, the piston shifts axially in the cylinder 53 and, through the chains 56, turns the shafts 43 to rotate the arms inwardly toward the jaws to bring the latter into clamping engagement with opposite sides of the workpiece as shown in Fig. 2.

As soon as the workpiece 10 is clamped between the jaws 18 and 19, the rotary motor 32 is energized to turn the sheaves 28 and, through the frictional engagement between the latter and the plate peripheries 21, rotate the carrier 15 counterclockwise as shown in the drawings and through 180 degrees to its unloading position in which the other plate projection 26 engages the other channel 27 as shown in Fig. 2. Once the carrier reaches this unloading position, the reversing valve 61 is actuated again to separate the jaws and bring the then lower jaw 19 with the workpiece thereon into alinement with the other conveyor 12 for transfer of the workpiece onto the latter. The carrier is then rotated clockwise and back to its loading position to receive another workpiece.

It will be apparent that, due to the shape of the carrier 15 as a C with the work receiving recess 16 opening both radially and axially, the novel turnover apparatus described above may handle workpieces of widely varying sizes which are limited in dimension only by the spacing of the jaws 18 and 19 and which may be transferred into or out of the recess either radially or axially. By extending the recess radially and inwardly past the carrier axis 17 so that the latter extends through workpieces in the recess and by spacing the jaws 18 and 19 equidistantly from the axis and moving the same in unison, a clamped workpiece 10 is substantially centered about the carrier axis so as to require a small turning force even for a heavy workpiece and thereby permit the carrier to be rotated through a friction drive. The jaw actuating mechanisms 41, in addition to moving the jaws through their desired range of movement while requiring no more space than that between the jaws and the outer periphery 21 of the carrier, also provide straight line movement of the jaws so as to eliminate the necessity of accurate supporting guideways for the jaws.

I claim as my invention:

1. In a turnover apparatus, the combination of, a rotary carrier adapted to be supported on its periphery for rotation about a predetermined axis, a pair of generally flat parallel jaws disposed parallel to and straddling said axis and defining opposed walls of a work receiving recess, two jaw supporting and actuating mechanisms one for each of said jaws and each mounted on said carrier within said periphery thereof and connected to a jaw to support the latter and move the same toward and away from said axis and the other jaw to clamp and release workpieces, each of said mechanisms comprising a pair of laterally spaced parallel shafts journaled in said carrier within said periphery thereof and between the latter and said recess, a pair of arms secured to and projecting radially and outwardly away from said shafts at each of two points spaced along the latter, a pair of bell cranks connecting each of said pairs of arms and the associated one of said jaws and fulcrumed at spaced points on the latter with one bell crank pivotally connected at the outer end of one of its legs to each of the arms, pivotal and sliding connections between the free ends of the other legs of each of said pairs of bell cranks, and a single power actuated member mounted on said carrier within said periphery thereof and connected to said shafts to oscillate the latter in unison to move said jaws toward and away from each other.

2. In a turnover apparatus, the combination of, a carrier adapted to be supported on its periphery for rotation about a predetermined axis, means on said carrier defining a work receiving recess and including a generally flat jaw disposed parallel to and spaced from said axis, and power actuated mechanism connected to said jaw to support the latter and move the same toward and away from said axis, said mechanism including two laterally spaced shafts journaled in said carrier between said periphery thereof and said jaw and disposed parallel to said axis, means connecting said shafts for oscillation in unison, a first pair of arms one secured to and projecting radially from each of said shafts, and a first pair of bell cranks fulcrumed at spaced points on said jaw with one pivotally connected at the outer end of one of its legs to each of said arms, the other legs of said bell cranks projecting toward each other and pivotally and slidably connected at their outer ends, and second pairs of similar bell cranks and arms connecting said jaw and said shafts and spaced along the latter from said first pairs.

3. In a turnover apparatus, the combination of, a carrier adapted to be supported on its periphery for rotation about a predetermined axis, a pair of jaws defining opposed walls of a work receiving recess on said carrier, two jaw supporting mechanisms one for each of said jaws mounted on said carrier within said periphery thereof and connected to the jaws to support the same for movement toward and away from each other, said mechanisms including shafts journaled on said carrier within said periphery and between the latter and said jaws, arms projecting rigidly from said shafts, and links pivotally connected at opposite ends to the arms and the respective jaws, a flexible drive element extending around said recess within said periphery and connected to said shafts for both of said jaws for rotation of the shafts in opposite directions to shift the jaws toward and away from each other during movement of the element back and forth, and a power actuator mounted on said carrier within said periphery and connected to said flexible element for moving the same back and forth.

4. In a turnover apparatus, the combination of, a carrier adapted to be supported on its periphery for rotation about a predetermined axis, means on said carrier defining a work receiving recess and including an elongated jaw constituting one wall of the recess, and power actuated mechanism on said carrier connected to said jaw to support the jaw and move the same toward and away from an opposed wall of said recess, said mechanism comprising two laterally spaced shafts extending longitudinally of said jaw and journaled in said carrier between said periphery thereof and said recess, a plurality of arms secured to and projecting radially from said shafts in pairs spaced along the shafts, a plurality of links one pivotally connected at one end to each of said arms and at its other end to said jaw for shifting of the latter sidewise during turning of said shafts, and means connected to said jaw and operating, during sidewise shifting thereof, to maintain the jaw in a rectilinear path.

5. Turnover apparatus having, in combination, a base, friction rollers mounted on said base in two horizontally spaced parallel rows, a rotary carrier frictionally engaging said rollers at the periphery of the carrier and resting on and supported by the rollers for rotation of the carrier about a horizontal axis spaced above and paralleling said rows, a pair of jaws spaced apart on opposite sides of said axis and defining opposed walls of a generally rectangular recess opening radially from said carrier and axially through opposite ends thereof and extending radially and inwardly beyond the axis, means supporting said jaws on said carrier for sidewise movement toward each other and said axis to clamp workpieces in a centered position relative to the axis with the latter extending through the workpiece, and means for rotating said friction rollers to turn said carrier about said axis between two positions in which said recess opens horizontally in opposite directions from said axis, said jaw supporting means being disposed within said periphery of said carrier.

6. Turnover apparatus having, in combination, a base, rotary drive elements mounted on said base in two horizontally spaced parallel rows, a rotary carrier having driving engagement with said elements at the periphery of the carrier and resting on and supported by the elements for rotation about a horizontal axis spaced above and paralleling said rows, a pair of jaws spaced apart on opposite sides of said axis and defining opposed walls of a generally rectangular recess opening radially from said carrier and axially through opposite ends thereof and extending radially and inwardly beyond the axis, means supporting said jaws on said carrier for movement through equal distances toward each other and said axis to clamp workpieces in a centered position about the axis, and means for rotating said drive elements to turn said carrier about said axis between two positions in which said recess opens horizontally in opposite directions from the axis, said jaw supporting means being disposed within said periphery of said carrier.

References Cited in the file of this patent

UNITED STATES PATENTS

| | | |
|---|---|---|
| 1,231,092 | Suhm | June 26, 1917 |
| 1,854,130 | Francis | Apr. 12, 1932 |
| 1,967,683 | Ostrander | July 24, 1934 |
| 2,157,642 | Vosler | May 9, 1939 |
| 2,226,068 | Mosley et al. | Dec. 24, 1940 |
| 2,520,252 | Mutchler | Aug. 29, 1950 |
| 2,671,956 | Krietemeyer | Mar. 16, 1954 |